United States Patent
Graham et al.

(10) Patent No.: US 9,232,185 B2
(45) Date of Patent: Jan. 5, 2016

(54) AUDIO CONFERENCING SYSTEM FOR ALL-IN-ONE DISPLAYS

(71) Applicant: ClearOne Communications, Inc., Salt Lake City, UT (US)

(72) Inventors: Derek Graham, South Jordan, UT (US); David K. Lambert, South Jordan, UT (US); Peter H. Manley, Draper, UT (US)

(73) Assignee: ClearOne Communications, Inc., Salt Lake City, UT (US)

( * ) Notice: Subject to any disclaimer, the term of this patent is extended or adjusted under 35 U.S.C. 154(b) by 112 days.

(21) Appl. No.: 14/084,389

(22) Filed: Nov. 19, 2013

(65) Prior Publication Data

US 2014/0139615 A1    May 22, 2014

Related U.S. Application Data

(60) Provisional application No. 61/728,681, filed on Nov. 20, 2012.

(51) Int. Cl.
 *H04N 7/15*  (2006.01)
 *H04R 3/00*  (2006.01)
 *H04R 1/08*  (2006.01)

(52) U.S. Cl.
 CPC ............... *H04N 7/15* (2013.01); *H04R 3/005* (2013.01); *H04R 1/08* (2013.01); *H04R 2420/07* (2013.01); *H04R 2420/09* (2013.01)

(58) Field of Classification Search
 CPC .................................. H04N 7/15; H04N 7/14
 USPC ......... 348/14.01–14.16; 704/201; 381/56, 66, 381/92
 See application file for complete search history.

(56) References Cited

U.S. PATENT DOCUMENTS

| | | | |
|---|---|---|---|
| 6,990,194 B2 | 1/2006 | Mikesell et al. | |
| D531,999 S | 11/2006 | Bourne et al. | |
| 7,180,731 B2 | 2/2007 | Titzler et al. | |
| D539,274 S | 3/2007 | Bourne et al. | |
| D556,189 S | 11/2007 | Bourne et al. | |
| D603,862 S | 11/2009 | Skinner et al. | |
| 7,715,180 B2 | 5/2010 | Titzler et al. | |
| D626,956 S | 11/2010 | Hsu | |
| 7,864,937 B2 | 1/2011 | Bathurst et al. | |
| 7,912,211 B1 | 3/2011 | Lambert | |
| 7,953,910 B2 | 5/2011 | Kakish | |
| 8,031,853 B2 | 10/2011 | Bathurst et al. | |
| 8,077,857 B1 | 12/2011 | Lambert | |
| 8,654,955 B1 * | 2/2014 | Lambert | 379/205.01 |

(Continued)

*Primary Examiner* — Melur Ramakrishnaiah
(74) *Attorney, Agent, or Firm* — TraskBritt, P.C.

(57) ABSTRACT

A conferencing system may comprise an electronic display configured to display remote video generated within a remote conference room, a speaker configured to reproduce remote audio generated within the remote conference room, and a processor configured to receive local audio generated within a local conference room and picked up by a microphone assembly that is part of a separate device from the electronic display. A related method may include displaying remote video on an electronic display of an all-in-one display, reproducing remote audio through at least one speaker of the all-in-one display; and performing echo cancellation of local audio using the remote audio as an echo cancellation reference. Another method may include receiving, at an all-in-one display, a plurality of local audio signals from a plurality of microphone assemblies that are separate from the all-in-one display, and controlling, within the all-in-one display, gating of the plurality of microphone assemblies.

20 Claims, 3 Drawing Sheets

(56) References Cited

U.S. PATENT DOCUMENTS

| | | | |
|---|---|---|---|
| 2004/0003045 A1* | 1/2004 | Tucker | H04N 7/152 709/205 |
| 2005/0233778 A1* | 10/2005 | Rodman et al. | 455/569.1 |
| 2010/0073455 A1* | 3/2010 | Iwabuchi et al. | 348/14.04 |
| 2010/0157015 A1* | 6/2010 | Read | 348/14.08 |
| 2011/0082690 A1* | 4/2011 | Togami et al. | 704/201 |
| 2013/0002803 A1* | 1/2013 | Esterberg et al. | 348/14.03 |
| 2013/0010053 A1* | 1/2013 | Daddi | 348/14.08 |

* cited by examiner

AUDIO CONFERENCING SYSTEM FOR ALL-IN-ONE DISPLAYS

PRIORITY CLAIM

This application claims the benefit of the filing date of U.S. Provisional Patent Application Ser. No. 61/728,681, filed Nov. 20, 2012, for "AUDIO CONFERENCING SYSTEM FOR ALL-IN-ONE DISPLAYS."

TECHNICAL FIELD

The present disclosure generally relates to all-in-one displays. More particularly, embodiments of the present disclosure relate to audio processing associated with an all-in-one display.

BACKGROUND

There are many software-based video conferencing applications designed to run on commodity personal computing platforms (e.g., "soft codecs"). Examples of such soft codecs have been developed by SKYPE®, MIRIAL® ClearSea, and RADVISION SCOPIA®. In the past, personal computers were not powerful enough to provide high definition video (720p or 1080p) at 30 frames per second or higher. As a result, there was a noticeable difference in quality that was achieved on personal computing hardware as compared to dedicated room video conferencing systems (i.e., "hard codecs") available from companies such as POLYCOM® and CISCO®. With advances in central processor and graphics processor capabilities, inexpensive commodity personal computing hardware may be used to provide high definition video that is substantially equivalent to the video available from hard codecs that are dedicated to a particular room.

Teleconferencing systems, such as all-in-one (AIO) video conferencing units (also referred to herein as "AIO displays") may be based on personal computing platforms. AIO video conferencing units may include personal computer (PC) hardware, speakers, a microphone (e.g., single microphone, microphone array, etc.), and a camera that are built into (or mounted to) the electronic display. As a result, low cost platforms may be deployed that provide video having similar or equal quality compared with dedicated hard codecs for videoconferencing that are relatively expensive.

The AIO display may also be relatively simple to set up compared with traditional hard codecs. For example, the AIO display may simply be placed in a conference room (e.g., mounted on a conference room wall), and then connected to power and a network (e.g., Internet, private intranet, cloud, etc.). Although AIO displays may provide high quality video, achieving high quality audio for a group conference may be difficult using conventional AIO displays.

For example, in a video conference made up of eight to twelve participants, a soft codec running on a conventional AIO display does not, by itself, provide an optimal audio conferencing environment. There are at least two reasons for this: conventional AIO displays often (1) use single omnidirectional microphones, and (2) have independent audio subsystems.

Conventional personal computer motherboards and sound cards used in AIO displays provide a single microphone input. This microphone input may be connected to an omnidirectional microphone in order to pick up audio in the local room. The single omnidirectional microphone may be placed in the middle of a conference table. A problem that may arise with this configuration is that omnidirectional microphones may pick up a significant amount of noise from directions other than the direction from which any given person is speaking. As a result, the signal to noise ratio (SNR) of the audio signal captured by the microphone may be relatively low. In addition to this SNR issue, an omnidirectional microphone may pick up speech energy that is reflected from various surfaces in the conference room in addition to the direct path speech from the talker. This may contribute to a "hollow" sound reproduced at the far end (i.e., remote conferencing room) for the remote participants of the video conference.

In order to address the issues of using a single omnidirectional microphone, some AIO displays include a microphone array in the bezel of the display. While this configuration may provide an improvement over the conventional use of single omnidirectional microphones placed in the middle of a large conference table, the microphone array will tend to provide a better SNR for speech from local participants who are sitting closest to the microphone array and a worse SNR for speech from local participants sitting farthest away.

In addition, when developing an AIO display one method currently being employed is to simply combine a personal computer subsystem with a display subsystem in a single enclosure. This configuration may cause a problem with the audio portion of the conference if the display subsystem supports the ability to accept audio inputs that are independent of the personal computer subsystem's audio inputs. The audio from a video conference will typically play through the PC's audio inputs. The display controller for the electronic display will also typically have an independent audio amplifier so that users can control the display's volume using a handheld remote control. A conventional method to integrate these two audio subsystems (i.e., audio from the PC subsystem and audio from the display subsystem) is to connect the PC's analog audio output to one of the analog audio inputs on the electronic display. During an audio conference, an acoustic echo cancellation (AEC) may be employed to prevent coupling of local playback audio into the microphone transmit signal. If the PC's audio output level is independent of the display's output level, the user may inadvertently set up the independent volume controls so that the PC output level is set relatively low and the display controller's volume level is set to a relatively high level to compensate.

The AEC may be designed to expect the acoustic power level of an echo signal to be close to the acoustic power level of the received signal. This is because usually there is an attenuation of signal power between the local speakers and the microphone. This attenuation is referred to as the Echo Return Loss (ERL). If the echo power that the AEC detects at the microphone is much larger than is expected (e.g., due to large external amplification), the AEC may mistake the echo power for local speech. As a result, the AEC may enter a half-duplex mode if its adaptive filter has not yet converged. When the AEC is in a half-duplex mode, the AEC may mute playback audio in order to let the local microphone audio through. As a result of muting playback audio, the microphone signal may be attenuated to zero. The AEC may detect this attenuation of the microphone signal as the end of the double talk state and allow the received audio to play into the room again. Due to the large external gain, the AEC may immediately (erroneously) detect the onset of local speech and again mute the playback audio. This cycle may continue indefinitely, which may result in choppy, unintelligible playback audio.

Another problem with audio processing with conventional AIO displays is that even if the PC audio level and the display controller amplifier levels are appropriately configured to begin with, a user may increase the analog gain on the display controller at a later time. Because this gain change may not be included in the AEC reference signal, acoustic echo may occur because the AEC may erroneously decide during far end single talk that the loud signal suddenly being picked up by the microphone is local speech, when in fact the signal is just echo. In addition to the problems described above, if the analog audio level coming from the PC is relatively low compared to the noise floor, and then a large amplification is applied in the display controller, the playback audio may sound noisy.

SUMMARY

Embodiments of the present disclosure include a conferencing system. The conferencing system comprises an electronic display configured to display remote video generated within a remote conference room, a speaker configured to reproduce remote audio generated within the remote conference room, and a processor configured to receive local audio generated within a local conference room and picked up by a microphone assembly that is part of a separate device from the electronic display.

Another embodiment of the present disclosure includes a method, comprising receiving remote audio and remote video from a remote conference room participating in a video conference session, displaying the remote video on an electronic display of an all-in-one display, reproducing the remote audio through at least one speaker of the all-in-one display; and performing echo cancellation of local audio using the remote audio as an echo cancellation reference. The local audio may be picked up at a location within a local conference room that is separate from the all-in-one display.

Another embodiment includes a method, comprising receiving, at an all-in-one display, a plurality of local audio signals from a plurality of microphone assemblies that are separate from the all-in-one display, and controlling, within the all-in-one display, gating of the plurality of microphone assemblies.

DETAILED DESCRIPTION

Figure 1:
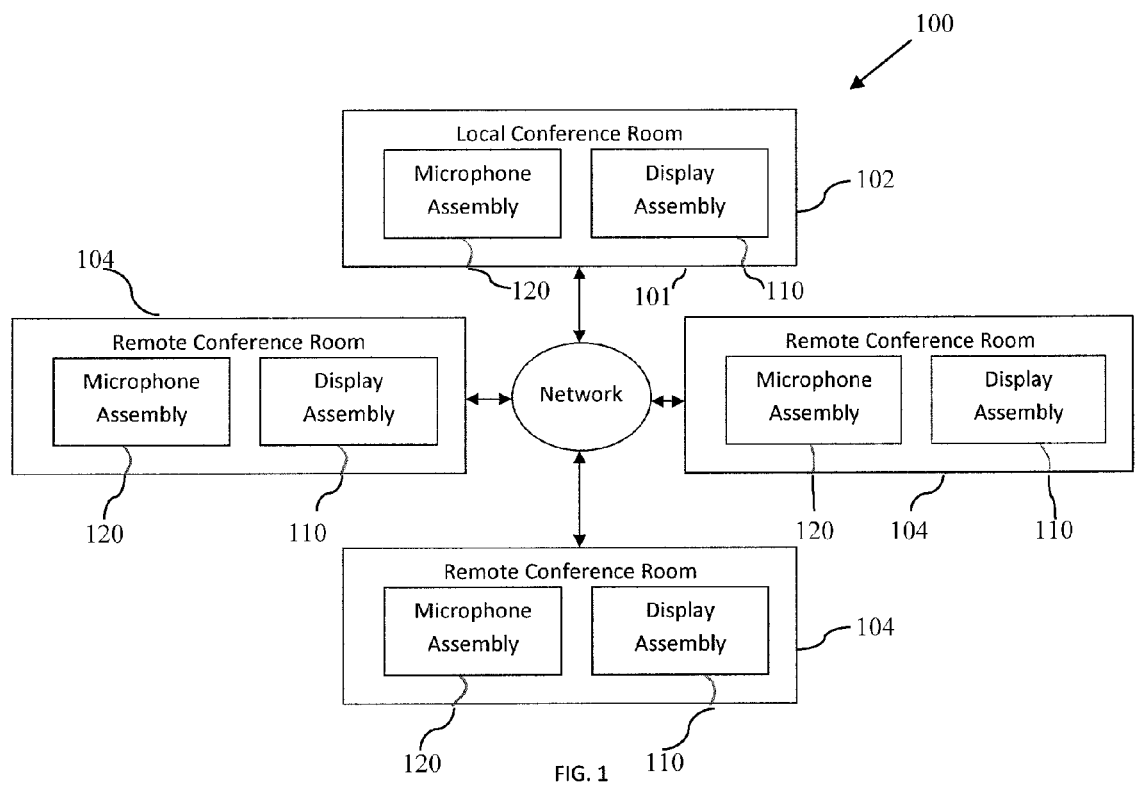
FIG. 1 is a plurality of conferencing systems coupled together over a network according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include an AIO system configured to enable soft codecs to be executed by a processor, wherein the soft codecs are configured to provide quality audio for a conferencing application. The soft codecs may be configured to provide echo cancellation and selective mixing of audio to be applied to the entire conferencing system. As a result, users may obtain high quality audio and video conferencing on commodity PC hardware, which may have performance similar (or equal) to much more expensive dedicated conferencing hardware.

FIG. 1 is a plurality of conferencing systems 100 coupled together over a network 101 according to an embodiment of the present disclosure. Each conferencing system of the plurality of conferencing systems 100 may include a display assembly 110 and a microphone assembly 120 being located in either a local conference room 102 or a remote conference room 104. "Local" and "remote" are relative terms in that "local" refers to the location that audio and/or video is generated, while "remote" refers to the location where audio and/or video is transmitted and reproduced for other participants of a conference. Thus, "local" audio is sound generated in a local conference room 102 from local participants and is transmitted to the remote conference rooms 104 to be reproduced for remote participants. "Remote" audio is sound generated in the remote conference room 104 from remote participants and reproduced in the local conference room 102 for the local participants. Local video and remote video are likewise relative terms that indicate whether the video displayed by the display assembly 110 is captured by a local camera or a remote camera relative to the particular participants.

It should be recognized that each conference room may act as a local conference room for itself and as a remote conference room relative to the other conference rooms having conferencing systems 100 connected to the network 101. For convenience, a single local conference room 102 and one or more remote conference rooms 104 is depicted in FIG. 1 and may be referred to as such throughout the disclosure.

The display assembly 110 may be configured as an AIO display and, at times, may also be referred to herein as an AIO display. The display assembly 110 may be configured with commodity PC hardware configured to run a soft codec for video and audio conferencing. The display assembly 110 may generally be configured to display video and re-produce audio generated in one or more remote conference rooms 104, the local conference room 102 or both. The display assembly 110 may also be configured to capture video from the local conference room for transmission to the one or more remote conference rooms 104, display within the local conference room 102, or both.

The microphone assembly 120 may generally be configured to capture audio from the local conference room 102 for transmission to the one or more remote conference rooms 104, reproduction within the local conference room 102, or both. The microphone assembly 120 may also be referred to herein as a microphone pod.

Figure 2A:
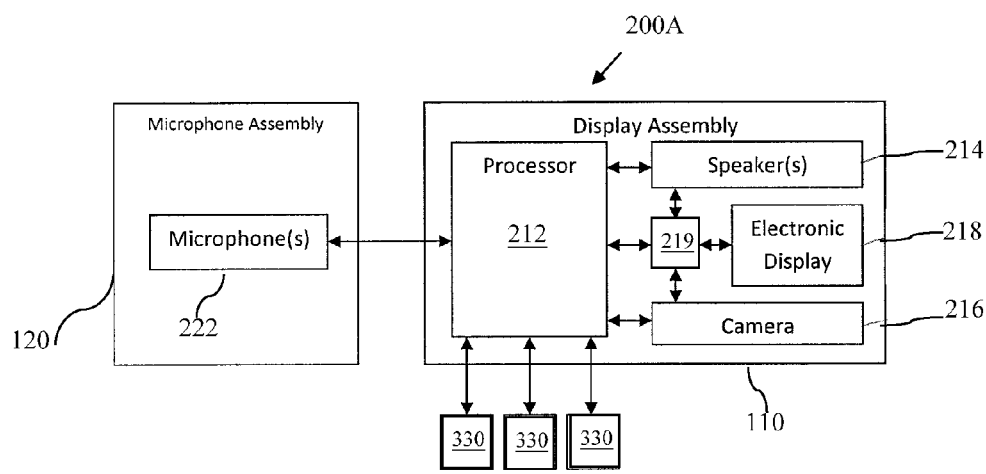
FIG. 2A is a conferencing system according to an embodiment of the present disclosure.

FIG. 2A is a conferencing system 200A according to an embodiment of the present disclosure. The conferencing system 200A includes the display assembly 110 operably coupled with the microphone assembly 120 that could be located in either the local conference room 102 (FIG. 1) or the remote conference room 104 (FIG. 1).

As discussed above, the display assembly 110 may be configured as an AIO display configured to run a soft codec to display video and reproduce audio during operation of a video conference. The display assembly 110 may include a processor 212, a speaker 214, a camera 216, an electronic display 218, and a display controller 219. Each of the speaker 214, the camera 216, and the electronic display 218 may be operably coupled with the processor 212. The electronic display 218 may be coupled with the processor 212 through the display controller 219. The display assembly 110 may further include additional components that are not shown so as to not obscure the figure. For example, one of ordinary skill in the art would understand that the display assembly may include additional components configured to transmit and receive signals for communicating with the other participants in the video conferencing session.

In some embodiments, the connection between the microphone assembly 120 and the display assembly 110 may include a wired connection. For example, a universal serial bus (USB) cable (or other suitable connector) may couple the microphone assembly 120 and the display assembly 110 such that the local audio signal may be transmitted from the microphone assembly 120 to the display assembly 110. In some embodiments, the connection between the microphone assembly 120 and the display assembly 120 may include a wireless connection for transmitting the local audio signal.

At least some (if not all) the components of the display assembly 110 may be integrated within the same housing. For example, the display assembly 110 may have a form factor that has a built-in camera, speakers, and electronic display. In some embodiments, the camera 216 may be attached separately. In some embodiments, the speakers 214 may be mounted separately to (or proximate to) the electronic display 218. For example, the speakers 214 may be mounted to the housing of the display assembly 110 rather than being integrally formed with the housing of the display assembly 110.

The processor 212 may be configured to perform the processing of the soft codec application described herein. In particular, the processor may be configured to execute instructions (e.g., software code) to perform the various acts described herein. Software code may be stored within memory (not shown) associated with the processor 212. The processor 212 may further control various operations, such as audio and video processing. Further detail with regard to audio processing is described below with respect to FIG. 3.

The speaker 214 may include one or more speakers configured to reproduce remote audio and/or local audio. For example, in some embodiments the speaker 214 may include two speakers to provide left and right stereo audio, while other embodiments may include a speaker bar that is mounted above or below the electronic display 218. Other speaker 214 configurations are also contemplated.

The camera 216 may include any device for capturing local video for transmission to the remote conference room 104 to be displayed on its electronic display 218. The electronic display 218 may include any display device (e.g., LCD, LED, etc.) for displaying video received from a remote conferencing room 104 that is participating in the video conferencing session.

The microphone assembly 120 may include one or more microphones 222 configured to pick up local audio and transmit the local audio to the display assembly 110. The microphones 222 may be within a housing that is separate from the display assembly 110. The microphone assembly 120 may also be referred to as a "microphone pod." The microphone assembly 120 may be located in the local conference room 102 distant from the display assembly 110. One or more microphone assemblies 120 may be located within a local conference room 102 at one or more strategic locations to pick up audio from local talkers. For example, the microphone assembly 120 may be located on a conference table (see FIG. 3).

In some embodiments, the microphone 222 may include one or more microphones. For example, the microphone 222 may include one or more omnidirectional microphones, one or more unidirectional microphones, or a combination thereof. In some embodiments, a plurality of unidirectional microphones may be arranged within the microphone assembly 120 (e.g., along a circle) such that 360° coverage is achieved.

In operation, the microphones 222 may be located proximate local talkers to pick up local audio that is transmitted to the remote conference room 104 through the display assembly 110. Remote audio is received from the remote conference room 104 by the display assembly 110. The local audio is reproduced by the speakers 214, which may be located proximate the electronic display 218 of the display assembly 110. As a result, the conferencing system 200 may separate the speaker function and the processing function from the microphone assembly 120 that includes the microphones 222. The microphone assembly 120 may be configured to merely pass on the audio to the display assembly 110, whereas the display assembly 110 may perform the processing, communication, and reproduction of both the local and remote audio and the video.

The display assembly 110 may be further configured to support inputs from a plurality of external devices 230 in addition to the microphone assembly 120. For example, the display assembly 110 may be coupled to external devices 330, such as BluRay players, digital video recorders, cable/satellite TV decoders, etc. The inputs may receive video and/or audio from the external devices 230. As a result, the display assembly 110 may be configured to enable the user to replace the conferencing video signal from the remote conference room 104 with video from a DVD player, with a view of a PC desktop, or other views from other useful external devices 230. This would enable a remote training application where the training video content might be available from a local video recording that could be streamed to remote participants along with the local audio so that an instructor could play a video, and pause the video at appropriate times to add commentary or show a presentation.

The display assembly 110 may also include a handheld remote control (not shown) configured to enable a user to select which video input they want to display on the electronic display 218. The remote audio from the remote conference room 104 may also be one of the sources that of audio/video that is selectable by a user.

Because there may be a plurality of sources of video and/or audio, the processor 212 may be configured to have an audio line input port that is connected to the audio line output port of the display assembly 110. In some embodiments, a digital audio interface may be employed. As a result, audio from the selected external device 230 (e.g., TV input source) may be routed to the processor 212 for playback through the speakers 214. In such an embodiment, the speakers 214 may not be connected directly to the video display controller 219. As a result, the processing module of the processor 212 may be configured to support stereo (or multi-channel) so that regardless of which audio/video source is selected, the participants in the remote conference room 104 may hear little to no echo. Thus, a local conference participant may play program audio without the remote participants in the remote conference room 104 being able to hear what was being played. If all the processing were implemented in software running on the processor 212 within the display assembly 110, the processor 212 may include additional software modules such as a mixer, a sample rate converter, etc.

The display controller 217 may include control logic configured to control functions of the audio and/or video. For example, the display controller 219 may include an amplifier for controlling volume of the audio signal to be reproduced by the speakers 212. The display controller 219 may further be configured to display multiple video feeds on the electronic display 218. For example, the display controller 219 may support "picture in picture," in which a main video source is displayed and a smaller overlay having a different video feed is also displayed. In some embodiments, the display controller 219 may support a "split screen" feature, in which multiple video feeds are displayed side by side.

Figure 2B:
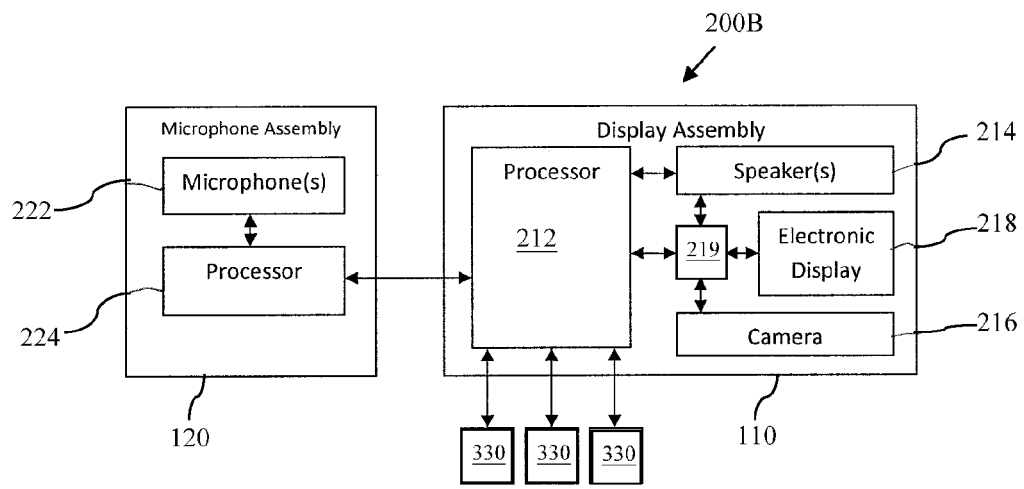
FIG. 2B is a conferencing system according to another embodiment of the present disclosure.

FIG. 2B is a conferencing system 200B according to another embodiment of the present disclosure. In some embodiments, the microphone assembly 120 may include a processor 224 coupled with the microphones 222. As a result, at least some of the audio processing may be performed by the microphone assembly 120.

In operation, the microphones 222 may pick up local audio from local talkers in the local conference room 102 (FIG. 1). The display assembly 110 may receive the remote audio and video from the remote conference room 104 (FIG. 1). A copy of the remote audio may be transmitted from the display assembly 110 to the microphone assembly 120 so that the processor 224 of the microphone assembly 120 can use the remote audio as an echo cancellation reference. As a result, the echo attributed to the remote audio being played by the speakers 214 may be removed from the local audio picked up by the microphones. Thus, the local audio signal sent to the remote participants may be more intelligible and higher quality than conventional systems while still permitting separate microphone assemblies to be located at locations away from the display assembly 110.

In some embodiments, the microphone assembly 120 may include a speaker (not shown). The speaker within the microphone assembly may also be configured reproduce remote audio from the remote conference room 104. For example, some microphone assemblies may currently be used in a teleconferencing application where video and, therefore, a display assembly, are not needed. Due to schedule or cost pressures, it may be desirable to reconfigure such microphone assemblies that have already been produced to operate according the various embodiments of the present disclosure. In some embodiments, speakers within the microphone assembly 120 may be disabled and the remote audio may be reproduced by the speakers 214 of the display assembly 110.

For FIGS. 2A, 2B, the volume of the audio may be controlled at a single point. For example, even though the display assembly 110 may include a PC sound card with one volume control and a display controller 219 with an independent volume control, audio quality will may be improved if the audio is tapped off after the display controller 219 and provide a copy of that audio to the line in of the sound card. If the echo cancellation is performed in an external microphone assembly 120 (e.g., as in FIG. 2B), a copy of that audio may also be sent to the microphone assembly 120 (e.g., through a USB connection). In another embodiment, the audio output of the display controller 219 may be provided as an echo cancellation reference input to the echo cancellation module. Thus, even if a user were able to change the volume multiple locations, the degradation of the audio performance may be reduced if the last point in the audio path just before the remote audio was sent to the speakers 214 was used to route a copy of the remote audio back to the line input of a sound card, is present. In another embodiment, a custom display controller may plug into a PC motherboard's USB input, which may appear as an external USB sound card supporting both audio capture and playback. As a result, audio level changes made on the PC in the display assembly 110 may be synchronized with the level at the display controller 219. If echo cancellation is performed in an external connected peripheral (e.g., microphone assembly 120), a software splitter may be used to send a copy of the reference remote audio to the external connected peripheral.

Figure 3:
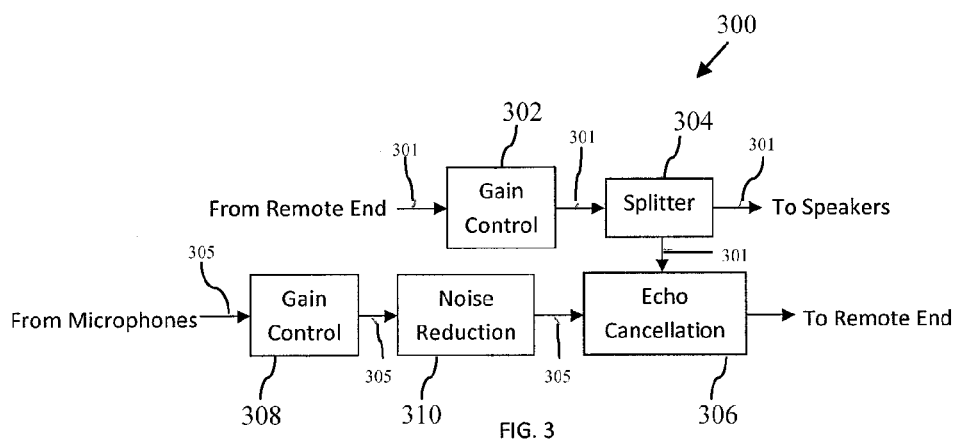
FIG. 3 is a software block diagram for audio routing of a conferencing system according to an embodiment of the present disclosure.

FIG. 3 is a software block diagram for audio routing of a conferencing system 300 according to an embodiment of the present disclosure. In particular, the software block diagram may represent one or more modules of a soft codec application configured to control and perform the audio processing and routing during a video conferencing session.

Remote audio 301 may be received from the remote conference room 104 (FIG. 1), such as at the display assembly 110 (FIG. 1). The remote audio 301 may be received by a gain module 302 (e.g., automatic gain control (AGC)) configured to apply a gain to the remote audio 301. The remote audio 301 may also received by a splitter module 304 configured to send a copy of the remote audio 301 to the speakers 214 (FIGS. 2A, 2B) and another copy of the remote audio 301 to an echo cancellation module 306 after all gain and processing has been applied. Thus, the gain control may be applied to the remote audio 301 in one place so that the gain control is consistent for the copies of the remote audio 301 that are sent throughout the conferencing system 300, such as to the speakers 214 and the echo cancellation module 306.

The echo cancellation module 306 may also receive the local audio 305 from the microphones 222 (FIGS. 2A, 2B). The local audio 305 may pass through a gain control module 308 and a noise reduction module 310 prior to the echo cancellation module 306. The remote audio 301 may be used in the echo cancellation module 306 as an echo cancellation reference for reducing or eliminating the contributions (echo) of the reproduction of the remote signal 301 by the speakers 214 (FIGS. 2A, 2B) of the local sound picked up by the microphones 222. As a result, high quality local audio may be picked up by the microphone assembly 120 while the remote audio would be canceled by the echo cancellation module 306 and not sent back to the remote conference room 104.

In some embodiments, the echo cancellation module 306 may be stored by the microphone assembly 120 as an audio processing module such that echo cancellation may be performed within the microphone assembly 120. As a result, the display assembly 110 may transmit the remote audio 301 to the microphone assembly 120. The microphone assembly 120 may perform echo cancellation on the local audio, and the local audio 305 (with echo cancellation) may be transmitted to the display assembly 110 for transmission to the remote end (i.e., the remote conference room 104).

Figure 4:
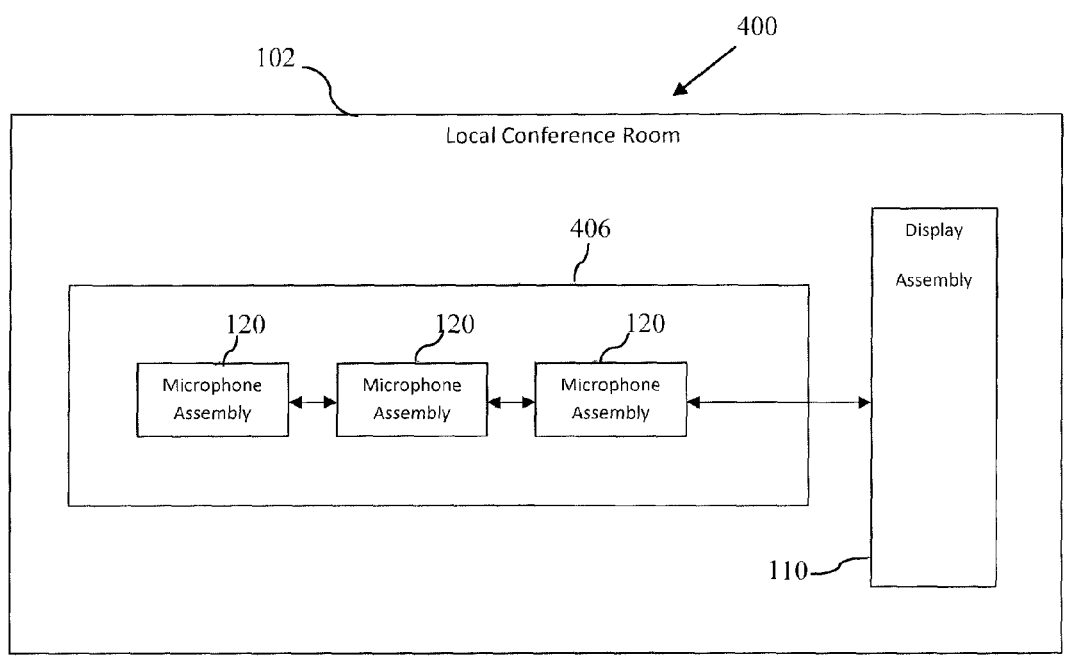
FIG. 4 is a conferencing system according to an embodiment of the present disclosure.

FIG. 4 is a conferencing system 400 according to an embodiment of the present disclosure. In particular, the conferencing system 400 may include the display assembly 110 coupled with a plurality of microphone assemblies 120 in the local conference room 102 (see FIG. 1). The conferencing system 400 may include one or more microphone assemblies 120.

The display assembly 110 and the microphone assemblies 120 may include various components according to the various configurations described with respect to FIGS. 2A, 2B, and 3. Each of the microphone assemblies 120 of the plurality include their own microphones 222 (FIGS. 2A, 2B) within separate housings. Similarly, for embodiments where the microphone assemblies 120 include a processor 224 (FIG. 2B), the processor 224 may be coupled with the microphones 222 within the associated housing.

As discussed above, each microphone assembly 120 may include a plurality of directional microphones arranged to have the desired coverage for the microphone assembly 120 (e.g., three microphones at points along a circle for 360° coverage). In addition, each individual microphone 222 may have its own dedicated echo cancellation module 306, noise reduction filter 310, and gain control module 308. As a result, the processor 212 may receive a plurality of local audio signals 305 for each individual microphone 222 within each microphone assembly 120.

The plurality of microphone assemblies 120 may be located in the local conference room 104 proximate talkers to pick up local audio from the talkers. For example, the plurality of microphone assemblies 120 may be placed on a conference table 406 where the talkers may be seated. In some embodiments, the plurality of microphone assemblies 120 may be placed in strategic locations within the local conference room 102, such as attached to the ceiling or other suitable location. For embodiments where a plurality of microphone assemblies 120 are used, a variety of arrangements may be used including wired and/or wireless connections between the microphone assemblies 120 and the display assembly 110. For example, a daisy chain configuration for the plurality of microphone assemblies 120 is shown in FIG. 4. Other arrangements are also contemplated, including a star configuration or other suitable arrangement.

Furthermore, with a plurality of microphone assemblies 120, each microphone assembly 120 may be configured to be individually gated. The display assembly 110 may be configured to control each microphone assembly 120 such that each microphone assembly 120 may be activated or deactivated at a desired time. In addition, each microphone 222 within each microphone assembly 120 may be gated and activated or deactivated within an active microphone assembly 120. The gating control for each of the microphone assemblies 120 and microphones 222 may be performed within the display assembly 110 because the display assembly may have access to each local audio signal 305 from the conferencing system 400.

In operation, the microphone assembly 120 that is nearest the local talker that is currently speaking may be activated while the other microphone assemblies 120 may be deactivated. Within the active microphone assembly 120, the microphone nearest the local talker may also be activated while the other microphones 222 within the same microphone assembly 120 may be inactive. The determination of which microphone assembly 120 and microphones 222 may be determined in either hardware (e.g., as an external module) or software (e.g., using processor 212) by monitoring the local audio signals 305 and determine which exhibits a relatively stronger signal. Thus, the terms "activation" and "deactivation" do not necessarily refer to whether or not the microphone assemblies 120 pick up local audio and transmit the local audio to the display assembly 110. Rather, the terms "activation" and "deactivation" are used to refer to whether the local audio signal 305 from a particular microphone assembly 120 forms a substantial part of the local audio signal 305 that is transmitted to the remote conference room 104. As an example, local audio signals 305 that are from an inactive microphone assembly 120 or microphone 222 may be attenuated such that the local audio signals 305 from the active components may be dominant final local audio signal 305 transmitted to the remote conference room 104.

In some embodiments, the processor 212 may perform audio mixing on each of the local audio signals 305 for generating a composite local audio signal that is transmitted to a remote conference room 104. In some embodiments, a subset of the local audio signals 305 (e.g., a single local audio signal 305) may be selected by the processor 212 to be transmitted to the remote conference room 104 rather than mixing the entire set of local audio signals 305. In other words, the activation and deactivation of the microphone assemblies 120 may be accomplished within the processor 212 of the display assembly 110 by monitoring the local audio signals 305 from each of the microphone assemblies and transmitting a local audio signal 305 that may have contributions from one or more of the individual microphones 222 (e.g., either an individual audio or mixed audio). As a result, the SNR of the local audio transmitted to the remote conference room 104 may be improved, and the hollow sound experienced by the remote participants may be reduced.

Although the foregoing description contains many specifics, these are not to be construed as limiting the scope of the present disclosure, but merely as providing certain exemplary embodiments. Similarly, other embodiments of the disclosure may be devised which do not depart from the scope of the present disclosure. For example, features described herein with reference to one embodiment also may be provided in others of the embodiments described herein. The scope of the invention is, therefore, defined only by the appended claims and their legal equivalents, rather than by the foregoing description.

What is claimed is:

1. A conferencing system, comprising:
   an all-in-one display, comprising:
      a camera configured to capture local video within a local conference room for transmission to a remote conference room;
      an electronic display configured to display remote video generated within the remote conference room; and
      a speaker configured to reproduce remote audio generated within the remote conference room; and
      a processor configured to run a soft codec to process the remote video and remote audio, and to receive local audio generated within the local conference room and picked up by a microphone assembly that is part of a separate device from the all-in-one display.

2. The conferencing system of claim 1, further comprising the microphone assembly, wherein the processor of the all-in-one display is configured to send a copy of the remote audio to the speaker and another copy of the remote audio to the microphone assembly after all gain and other processing has been applied by the system.

3. The conferencing system of claim 2, wherein the microphone assembly includes a processor configured to perform echo cancellation on the local audio using the another copy of the remote audio as an echo cancellation reference.

4. The conferencing system of claim 3, wherein the microphone assembly is configured to transmit the local audio to the all-in-one display after echo cancellation is performed by the processor of the microphone assembly, and wherein the processor of the all-in-one display is configured to transmit the local audio to the remote conference room.

5. The conferencing system of claim 1, further comprising a plurality of microphone assemblies including the microphone assembly, each with separate housings that are operably coupled to communicate with the all-in-one display.

6. The conferencing system of claim 5, wherein the processor of the all-in-one display is configured to monitor local audio signals received from each microphone assembly of the plurality of microphone assemblies, and control gating of the plurality of microphone assemblies in response thereto.

7. The conferencing system of claim 6, wherein each microphone assembly of the plurality of microphone assemblies includes a plurality of individual microphones that generate individual local audio signals, wherein the processor of the all-in-one display is further configured to control gating of the plurality of individual microphones.

8. The conferencing system of claim 1, wherein the camera, the speaker, and the electronic display are built into a common form factor for a display assembly of the all-in-one display.

9. The conferencing system of claim 1, wherein the camera is mounted to the electronic display.

10. The conferencing system of claim 1, wherein the speaker has a separate housing that is mounted to a display assembly that houses the electronic display.

11. A method, comprising:
   receiving, at an all-in-one display, remote audio from a remote device in a remote conference room participating in a conference session;
   reproducing the remote audio through at least one speaker of the all-in-one display;
   capturing local video through a camera of the all-in-one display;
   transmitting the local video from the all-in-one display to the remote device in the remote conference room;
   performing echo cancellation of local audio using the remote audio as an echo cancellation reference, the local audio picked up by a microphone assembly at a location within a local conference room, wherein the microphone assembly is separate from the all-in-one display; and
   transmitting the echo cancelled local audio to the remote device.

12. The method of claim 11, wherein performing echo cancellation of the local audio includes receiving the local audio at the all-in-one display from the microphone assembly and performing the echo cancellation with a processor of the all-in-one display.

13. The method of claim 11, further comprising transmitting a copy of the remote audio from the all-in-one display to the microphone assembly, wherein echo cancellation is performed with a processor of the microphone assembly.

14. The method of claim 13, further comprising performing automatic gain control of the remote audio prior to transmitting the copy of the remote audio to the microphone assembly and also transmitting another copy of the remote audio to the at least one speaker of the all-in-one device.

15. The method of claim 11, further comprising disabling a speaker within the microphone assembly while remote audio is reproduced through the at least one speaker of the all-in-one display.

16. A method, comprising:
   capturing, by a camera of an all-in-one display, local video from a local conference room;
   transmitting, by a processor of the all-in-one display, the local video to remote device of a remote conference room;
   receiving, by a processor of the all-in-one display, remote audio signals from the remote device;
   receiving, at the processor of the all-in-one display, a plurality of local audio signals from a plurality of microphone assemblies that are separate from the all-in-one display; and
   controlling, within the processor of the all-in-one display, gating of the plurality of microphone assemblies.

17. The method of claim 16, wherein controlling gating of the plurality of microphone assemblies includes attenuating at least some of the local audio signals of the plurality of microphone assemblies received by the processor of the all-in-one display.

18. The method of claim 16, wherein controlling gating of the plurality of microphone assemblies includes activating or deactivating at least some of the plurality of local audio signals in response to a determination of which microphone assembly is proximate a local talker.

19. The method of claim 16, wherein controlling gating of the plurality of microphone assemblies further includes controlling gating of individual microphones within the plurality of microphone assemblies.

20. The method of claim 16, further comprising sending copies of a remote audio signal from the all-in-one display to each microphone assembly of the plurality for echo cancellation with the local audio signals.

\* \* \* \* \*